United States Patent [19]

Quade

[11] 4,299,660
[45] Nov. 10, 1981

[54] HEAT-EXTRACTION SYSTEM FOR GAS-COOLED NUCLEAR REACTOR

[75] Inventor: Robert N. Quade, La Jolla, Calif.

[73] Assignee: General Atomic Company, San Diego, Calif.

[21] Appl. No.: 916,349

[22] Filed: Jun. 16, 1978

[51] Int. Cl.³ .................................................. G21C 3/56
[52] U.S. Cl. .................................... 376/298; 376/317; 376/391
[58] Field of Search ........................ 176/37, 38, 60, 65

[56] References Cited

U.S. PATENT DOCUMENTS

| 3,029,060 | 12/1971 | Schmidt | 176/60 |
| 3,043,763 | 7/1962 | Spillmann | 176/60 |
| 3,155,547 | 10/1964 | Siebker | 176/60 |
| 3,666,623 | 5/1972 | Harand et al. | 176/60 |
| 3,802,994 | 4/1974 | Forster et al. | 176/60 |
| 4,022,659 | 5/1977 | Baumgaertner | 176/60 |
| 4,035,231 | 6/1977 | Ventre | 176/65 |
| 4,048,012 | 4/1977 | George et al. | 176/65 |
| 4,052,260 | 10/1977 | Forster et al. | 176/65 |
| 4,057,465 | 11/1977 | Thompson et al. | 176/60 |
| 4,066,499 | 1/1978 | Buthmann | 176/60 |

FOREIGN PATENT DOCUMENTS 1046829 10/1966 United Kingdom .................. 176/60

Primary Examiner—S. A. Cangialosi
Attorney, Agent, or Firm—Fitch, Even, Tabin, Flannery & Welsh

[57] ABSTRACT

The cavity within a pressure vessel for a gas-cooled nuclear reactor is divided into chambers by an intermediate support floor, with the reactor core thereabove and heat-exchangers therebelow. Separate heat-exchange units are connected to separate circulators which discharge the repressurized primary gas coolant through an annular passageway along the inner surface of the pressure vessel cavity. The heat extraction system includes a separate secondary gas coolant circuit connected to each heat-exchange unit, which coolant may be heated to about 850° C. at which it is suitable to provide process heat. Emergency cooling is effected by a heat dump which is connected into each secondary circuit to promptly provide low-temperature secondary gaseous coolant which then indirectly removes the reactor core heat.

5 Claims, 6 Drawing Figures

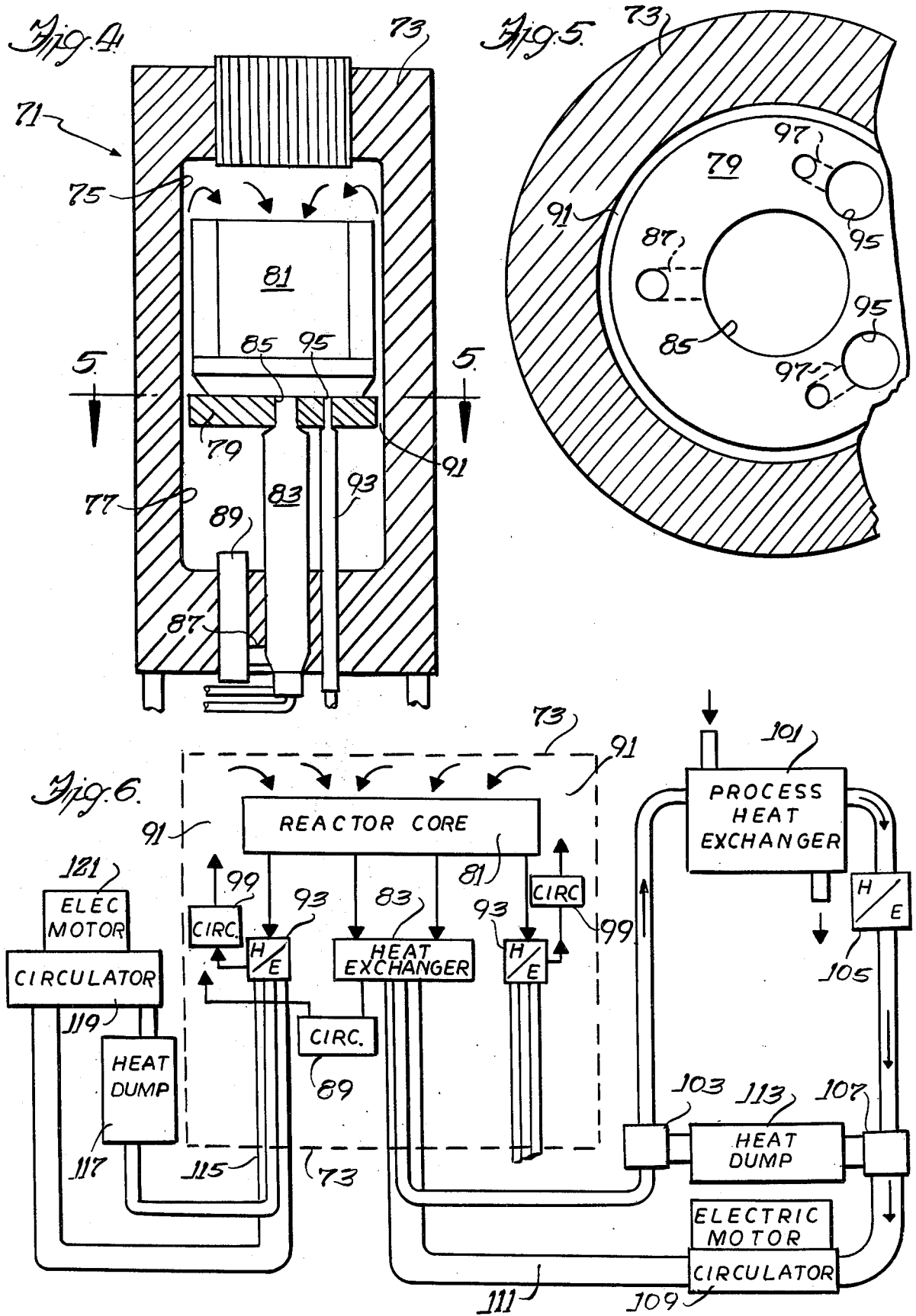

HEAT-EXTRACTION SYSTEM FOR GAS-COOLED NUCLEAR REACTOR

BACKGROUND OF THE INVENTION

This invention relates to nuclear reactors and more particularly to nuclear reactors designed to operate at very high temperatures for the purpose of supplying process heat.

Whereas most nuclear reactors heretofore built for power were designed to ultimately transform water into steam to drive a steam turbogenerator, with the rising cost of energy from fossil fuels, it now appears that there will be a commercial market for providing heat from nuclear reactors for industrial applications other than the generation of electricity. The term "process heat" is generally used to describe the category of reactors that are being designed for the purpose of supplying thermal energy to be used in chemical or physical applications other than the generation of electricity.

Certain considerations which were foremost when dealing with steam cycles for the generation of electricity, via the use of steam turbines, give way to other more important criteria when process heat applications are concerned. In high-temperature gas-cooled nuclear power reactors, the reactor core may be maintained at a temperature sufficient to produce a heat-extraction stream having a temperature of as high as 750° C.; however, for process heat applications, usable thermal energy at a temperature of 800° C. to 950° C. may be desired. When reactors operate at such very high temperatures, changes in reactor design are often dictated by such higher temperature considerations, and particularly from the standpoint of safety, there is much room for improvements in reactor design.

SUMMARY OF THE INVENTION

The present invention provides an efficient gascooled reactor system designed to produce process heat which takes safety into primary consideration and which achieves safe operation at very high temperatures without a large number of additional components for safety aspects. The reactor system includes a pressure vessel wherein the reactor core and all of the primary circuit heat-exchangers are located. As a result, it is not necessary for the primary coolant to flow outside the confines of the pressure vessel, and because the primary gas stream will inherently have some radioactivity, both safety and thermal energy considerations are enhanced by this arrangement.

A plurality of heat-extraction secondary loops are provided and for each heat-exchange unit associated with such a secondary loop, there is ducting which links that unit to a separate circulator. Thus, all of the hot coolant gas which passes through one particular heat-exchange unit, where it gives up its heat to a secondary coolant stream, flows directly through one circulator and does not come in contact with the pressure vessel boundary. The repressurized coolant gas exiting from the heat-exchanger unit is discharged to a boundary region of the pressure vessel so that the relatively cool gas flows upward along the interior surface of the pressure vessel, thus insulating the pressure vessel from the very high temperatures which are present in the core of the reactor. With this arrangement, the cool repressurized primary gas coolant surrounds all of the components containing the hot gas. Any failure of the component parts will only allow high pressure cool gas to flow inward, eliminating the potentially damaging possibility that hot gas could come in contact with the pressure vessel boundary.

The presence of steam in a graphite-moderated reactor operating in the temperature range of 850° C. to 950° C. or above would pose a significant danger because of the reaction kinetics of the potential steam-graphite reaction. Accordingly, a steam leak into a primary heat-exchanger located within the pressure vessel would not only cause release of fission products from the nuclear fuel in graphite fuel elements, but it could potentially weaken the graphite posts used to support the core. This potential danger is alleviated by employing a gas, such as helium, for the secondary heat-extraction fluid, so that there is an exchange of heat from gas to gas in the primary heat-exchange units. The employment of a secondary gas extraction system has the further advantage of permitting the individual heat-extraction loops to double as the emergency cooling system. Each heat-extracting loop includes a heat dump which is automatically and instantly connected into the loop as soon as emergency conditions occur. As a result, large quantities of relatively low temperature secondary coolant are promptly provided to the primary heat-exchangers within the pressure vessel, and consequently, the normal operation of the primary circulators will adequately promptly remove the residual heat remaining within the reactor core upon shutdown. The redundancy of similar loops greatly increases the probability that at least one emergency cooling system will operate if needed.

Another advantage of this arrangement is in the relative ease of performing the required in-service inspection. The separation of the refueling floor on the top face and the heat exchange/circulation equipment on the bottom face permits simultaneous refueling and inspection which reduces the outage time of the plant. Reduced outage is particularly important in process heat applications which normally operate the entire year at full capacity.

BRIEF DESCRIPTION OF THE INVENTION

A presently preferred embodiment of the invention is described in the following specification and will be clearly understood from its reading in conjunction with the accompanying drawings wherein:

FIG. 4 is an enlarged view, similar to FIG. 1 of an alternative embodiment of a nuclear reactor;

FIG. 5 is a horizontal sectional view taken along line 5—5 of FIG. 4; and

FIG. 6 is a diagrammatic view of the primary and secondary coolant flow arrangement throughout the reactor depicted in FIGS. 4 and 5.

DESCRIPTION OF THE PREFERRED EMBODIMENT

Figure 1:
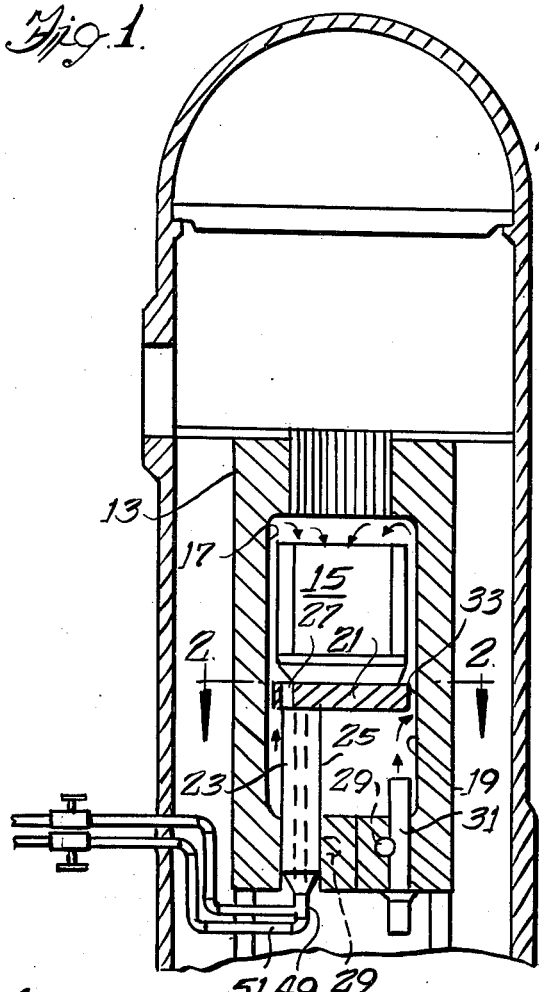
FIG. 1 is a vertical sectional view of a nuclear reactor illustrating a preferred embodiment of the invention.
Figure 2:
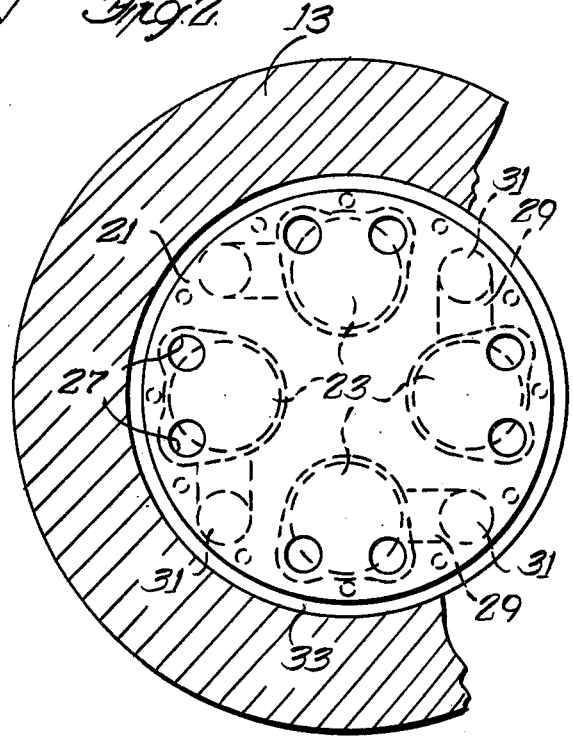
FIG. 2 is an enlarged horizontal sectional view taken generally along the line 2—2 of FIG. 1.

The illustrated nuclear reactor includes an exterior containment vessel 11 which may be made from reinforced concrete and which has the general shape of a cylindrical body surmounted by a hemispherical cap. Located generally centrally within the outer containment vessel 11 is a steel-reinforced concrete pressure vessel 13 wherein the nuclear reactor core 15 is located.

The pressure vessel 13 includes a central cavity which is divided into an upper portion 17 and a lower portion 19 by an intermediate plate or core support 21. The reactor core 15 is located in the upper portion 17 and is suitably supported upon the plate 21 by posts or the like (not shown). A plurality of heat-exchange units 23 are located in the lower portion 19 of the cavity. Each of the heat-exchange units 23 includes an individual outer casing or shroud 25, and each unit may include one or more sets of tube bundles, which may be arranged in series or parallel as desired. Entrance to the upper end of each heat-exchanger unit 23 is provided by a pair of passageways 27 through the intermediate plate 21; however, a single, slightly larger entrance passageway could be alternatively employed.

In the illustrated embodiment, the secondary coolant which absorbs heat in the units 23 flows inside the tube bundles whereas the hot gas primary coolant coming from the core, which is preferably helium, flows downward within the heat-exchange shroud 25 along the outer surface of the tube bundles, giving up its heat to the secondary coolant gas flowing within the tubes. As an example, the hot primary helium entering the top of the heat-exchange units 23 may be at a temperature of about 950° C., and after traversing the unit it will have given up sufficient heat to the secondary stream to lower its temperature to about 450° C.

The primary coolant stream exits from the heat-exchange unit 23 through a side outlet into a separate duct 29 which is provided in the bottom portion of the concrete pressure vessel 13 and which leads directly to a circulator 31 which is generally vertically disposed. The circulator 31 exhausts upward, discharging the repressurized, relatively cool helium into the lower cavity portion 19 where it flows about the exterior of the heat-exchange unit shrouds 25, thus insulating the high temperature thereof from the interior wall surface of the pressure vessel 13. The exhaust streams from all four primary coolant circulators 31 merge in the lower cavity portion 19, and the relatively cool helium flows upward through an annular channel 33 which is provided between the exterior of the intermediate plate 21 and the interior, cylindrical wall of the pressure vessel 13, which is generally provided with a suitable metal liner (not shown). Accordingly, the relatively cool helium bathes the entire cylindrical side wall of the pressure vessel 13 as it flows upward to the top of the upper cavity portion 17 where it flows inward across the under-surface of the top of the pressure vessel to descend and begin another pass through the core 15 of the reactor where it is reheated.

Figure 3:
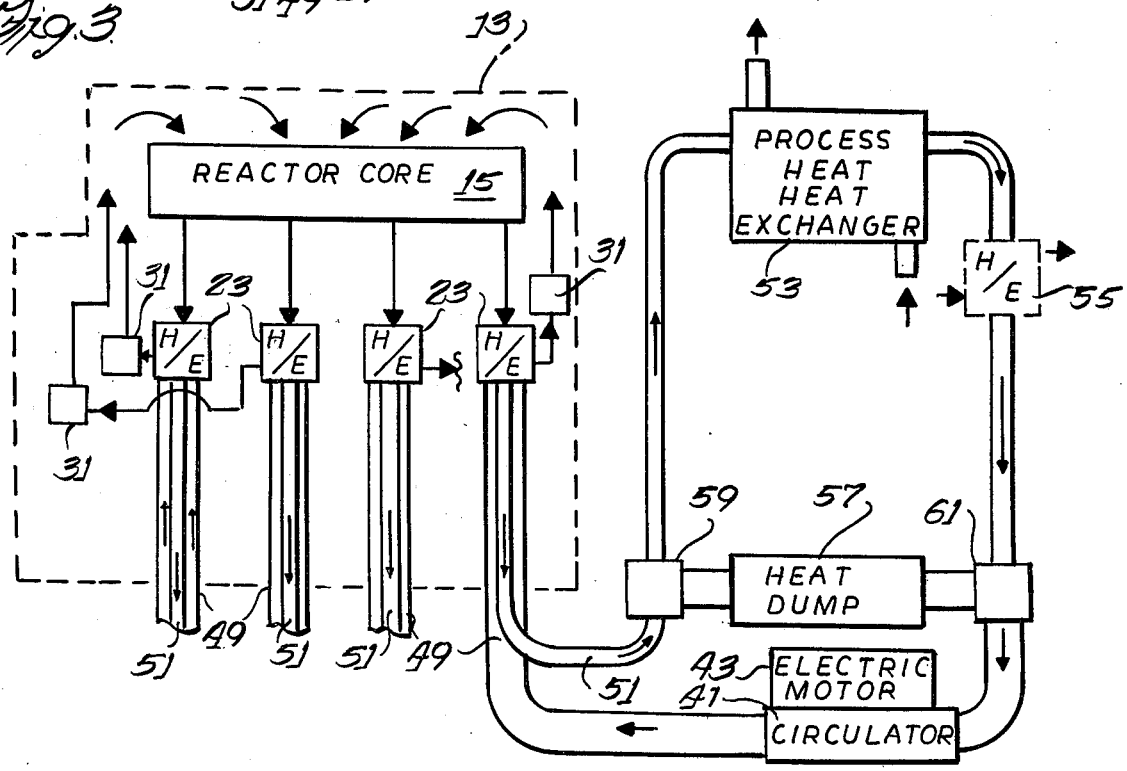
FIG. 3 is a diagrammatic view of the primary and secondary coolant flow arrangement throughout the reactor depicted in FIG. 1.

On the secondary coolant side, the coolant is a suitable inert gas, preferably helium, which has an advantage from a safety standpoint because if the secondary coolant stream pressure is maintained above the pressure of primary coolant stream, if any leak should occur, it would consist of helium leaking into the core. A separate secondary coolant circuit is provided for each of the heat-exchanger units 23, and one such circuit is illustrated in FIG. 3. Each secondary circuit includes its own circulator 41 which is driven by an electric motor 43 which is connected to a separate power supply. Accordingly, if there are four heat-exchanger units 23, there would be four secondary coolant circuits, four circulators 41, four electric drive motors 43 and four independent power supplies. This duplication of components allows the secondary coolant circuit to be used for emergency cooling and thus reduces capital expense by eliminating the need for separate emergency cooling circuits.

From FIGS. 1 and 3 it can be seen that the returning, relatively cool, secondary helium enters the reactor containment vessel 11 through the outer conduit 49 of a pair of concentric conduits leading up through the bottom of the pressure vessel 13 and into the tube side of the heat-exchange units 23. The heat-exchange units 23 are constructed so that, after traversing the desired flow path within the tube bundles, the hot secondary helium discharges from the bottom and flows through the interior conduit 51 of the concentric pipes to a location exterior of the reactor containment structure 11. If the hot primary helium is at a temperature of about 950° C., the secondary helium exiting from the heat-exchangers may likely be at a temperature of about 875° C. This hot secondary helium passes to a process heat-exchanger 53 where it gives up its thermal energy to a process heat application. Generally, the secondary helium should be at a temperature of at least about 850° C. so that, allowing for a reasonable Δt across a heat-exchanger, suitable process heat temperatures can be achieved. However, many different types of high-temperature, process heat applications are presently being considered, such as the reforming of petroleum, the gasification of coal, and other chemical and/or physical reactions which require different high temperature conditions.

Following extraction of the process heat, it may be desirable to extract further thermal energy from the hot helium in a lower temperature heat-exchanger 55, such as a steam generator, which could create steam for the generation of electrical power. The relatively cool secondary helium is sucked into the circulator 41 and then discharged to the pipe 49 leading back to the nuclear reactor, by which time its temperature may reasonably have been lowered to at least about 350° C.

Should emergency conditions occur, where it is necessary to quickly extract a larger quantity of heat from the reactor core, an arrangement is provided to automatically cut an external heat dump 57 into each of the secondary coolant circuits. The emergency heat dump 57 may be any suitable source of a lower temperature, for example, a large air-cooled tubing bank with auxiliary blowers to circulate atmospheric air past the extended tubing surface area at a high rate to extract heat from the secondary stream of helium coolant. The external heat dump is automatically switched into the flow path of the secondary circuit through the operation of valves 59 and 61.

The fast and effective cooling of the secondary coolant stream through the use of the external heat dump 57 promptly further lowers the temperature of the helium being returned to the heat-exchange units 23, for example, from its normal returning temperature of about 350° C. to about 250° C. As a result of the greater temperature differential, far more heat is extracted from the primary coolant stream in the heat-exchange units 23, and thus the primary coolant which is being discharged by the individual circulators 31 is substantially lower in temperature. Because all of the secondary circuits are structurally independent and have independent power supplies, there is sufficient reliability to assure that adequate emergency cooling of the core 15 can be provided in this manner.

The pressure vessel 13 is excellently protected because the still cooler helium is now being circulated along essentially the entire interior surface thereof. The provision of four separate heat-exchanger units 23, each one of which is linked to a circulator 31 also provides duplication within the primary circuit so that a single accident should not knock out more than one of the primary circulation systems. Accordingly, the core 15 will be promptly shut down during emergency conditions, and the primary coolant stream will serve to promptly extract the residual heat therefrom. This heat is in turn transferred to the secondary helium stream which is at a lower than usual temperature as a result of the introduction of the external heat dump 57 in each of the secondary circuits. As a result, an extremely effective arrangement is provided which is considered to be particularly advantageous from a safety standpoint in gas-cooled nuclear reactors that will be operated at very high temperatures in order to provide higher than normal temperatures for process heat applications.

Although the invention has been described with respect to certain preferred embodiments, it should be understood that changes and modifications as would be obvious to one having the ordinary skill in the art may be made without deviating from the scope of the invention which is set forth in the appended claims. In this respect, an alternative arrangement of a reactor system is depicted in FIGS. 4, 5 and 6.

A reactor 71 is depicted that would be arranged within a containment vessel similar to that shown in FIG. 1 and which contains a pressure vessel 73 having an interior cavity that is similarly divided into an upper chamber 75 and a lower chamber 77 by an intermediate support floor 79. The reactor core 81 occupies the major portion of the upper chamber 75, being supported on the intermediate floor 79 by suitable posts (not shown). Other suitable attachments of the support floor 79 to the pressure vessel may alternatively be employed.

Disposed in the lower cavity 77 is a large, centrally located, main heat-exchanger 83. The heat-exchanger 83 is vertically disposed and extends upward from the bottom of the pressure vessel to a large central opening 85 in the intermediate floor 79 which provides an entrance for the descending hot primary coolant. The primary gas coolant, which gives up its heat in the heat-exchanger 83, exits via a side passageway 87 leading to a main circulator 89 which is likewise supported in the bottom of the pressure vessel 73 and extends vertically upward. The circulator 89 discharges upward in the lower cavity 77, and in a similar manner to the reactor 11, the upward flow of primary coolant is channeled along the interior wall of the pressure vessel cavity by the intermediate support floor 79 which provides an annular passageway 91 as the only communication between the upper and lower chambers.

In addition to the main heat-exchanger 83, a pair of auxiliary heat-exchanger units 93 are provided which are connected by smaller passageways 95 leading downward through the intermediate support floor 79. These auxiliary heat-exchangers 93 also have side outlet passageways 97 which lead to independent auxiliary circulators 99 which, when operating, discharge upwardly toward the underside of the intermediate support floor 79.

In this embodiment, only the main secondary circuit is employed to extract process heat from the reactor 71, and the two minor secondary circuits are employed only for emergency cooling. This arrangement reduces the cost of nuclear process heat plants, particularly in plant sizes of about 50 to about 1000 MW(t), by reducing the number of complete operating loops to one with an attendant reduction in the quantity of heat-exchangers, piping, valves and instrumentation required.

The main extraction loop contains a large process heat-exchanger 101, the entrance to which is connected via a three-way valve 103 to the secondary coolant stream exiting from the main heat-exchanger 83 within the pressure vessel. The exit side of the process heat-exchanger 101 connects to a steam generator 105, the discharge side of which is connected through a three-way valve 107 to the suction side of the main secondary gas circulator 109. The circulator 109 discharges to a conduit 111 leading back to the pressure vessel 73 and which enters the pressure vessel through the outer of the pair of concentric conduits. A large heat dump 113 is connected between the two three-way valves 103, 107 and thus can be inserted into the secondary coolant circuit either in combination with the process heat-exchanger 101 or to the exclusion thereof when emergency cooling becomes necessary.

In addition to the provision of the main heat dump 113 in the main heat extraction circuit, a pair of additional secondary coolant circuits are provided in connection with the two auxiliary heat-exchange units 93. One of these circuits is depicted in FIG. 6, and it simply includes a similar concentric conduit entry-exit 115 into the pressure vessel 73 through which the relatively cool secondary gaseous coolant flows into the pressure vessel around the exiting hot gaseous coolant, which has extracted heat from the primary coolant in the auxiliary heat-exchanger units 95. This minor secondary coolant circuit includes a heat dump 117 plus a gaseous circulator 119 which is driven by an electric motor 121.

Accordingly, should an emergency occur, at the same time as the three-way valves 103, 107 are operated to insert the main heat dump 113 into the main secondary coolant circuit, the circulators 99 and 119 are started. This immediately causes the circulation of some of the primary coolant through the two auxiliary heat-exchanger units 93 at the same time as circulation begins in both of the auxiliary secondary circuits which include the additional heat dumps 117. Accordingly, from a safety standpoint, the system has adequate redundancy by the provision of the plurality of gaseous secondary cooland circuits, while being somewhat more economical because of the fact that there needs to be no duplication with respect to the more complicated, heat-extraction circuit through which the heat is conveyed to the process heat-exchanger 101.

Various of the features of the invention are emphasized in the claims that follow.

What is claimed is:

1. A gas-cooled nuclear reactor including
a reactor core,
a pressure vessel in which said core is located,
heat-exchange means in said pressure vessel,
primary circulator means for circulating gas coolant through said reactor core and then through said heat-exchange means, and
means including secondary circulator means for extracting heat from said reactor by causing a secondary gaseous coolant stream to flow through said heat-exchange means,
wherein the improvement comprises
said heat-exchange means raises said secondary gaseous coolant to a temperature suitable to supply heat for process heat applications, said primary circulator means being arranged to discharge the repressurized primary gas coolant along an inner boundary region of said pressure vessel, said pressure vessel having a cavity which is divided into upper and lower chambers by a horizontally-extending intermediate floor which supports said core thereabove and with said heat-exchange means and primary circuit circulator means being disposed in said lower chamber, said pressure vessel being circular in horizontal cross section and said floor being circular and of smaller diameter to provide an annular passageway which interconnects said upper and lower chambers and through which passageway the primary coolant discharge from said primary circulator means is returned to said reactor core, said heat extraction means including a plurality of secondary gas coolant circuits connected to said heat-exchange means, and emergency cooling means associated with each of said secondary circuits including heat dump means exterior of said pressure vessel for promptly providing relatively low temperature, secondary gas coolant in said circuit for emergency heat removal from said core whereby said secondary gas circulator means in addition to extracting the process heat from said reactor during normal operations also functions to extract heat from said reactor during emergency cooling.

2. A reactor in accordance with claim 1 wherein said heat-exchange means includes a plurality of separate units each of which is connected to a separate circulator located within said pressure vessel.

3. A reactor in accordance with claim 2 wherein said heat-exchange means includes a plurality of generally equally sized heat-exchange units and wherein each of said secondary circuits includes a process-heat heat-exchanger.

4. A reactor in accordance with claim 1 wherein said heat-exchange means includes a large, centrally located heat-exchange unit which is connected to a major secondary coolant circuit including a process heat-exchanger and also includes at least two smaller heat-exchange units which are connected to auxiliary secondary coolant circuits which contain heat-dump means.

5. A reactor in accordance with claim 1 wherein said hot secondary coolant from said heat exchange means exits said pressure vessel through the inner of concentric conduits and wherein the entire inner surface of said pressure vessel cavity is insulated by cooler gas from the higher temperature gas.

* * * * *